United States Patent
Lee

(10) Patent No.: US 8,585,810 B2
(45) Date of Patent: Nov. 19, 2013

(54) APPARATUS FOR REGENERATING A CARBON DIOXIDE ABSORPTION SOLUTION

(75) Inventor: Yoon Ji Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 512 days.

(21) Appl. No.: 13/030,490

(22) Filed: Feb. 18, 2011

(65) Prior Publication Data
US 2012/0132080 A1    May 31, 2012

(30) Foreign Application Priority Data
Nov. 30, 2010    (KR) ........................ 10-2010-0121037

(51) Int. Cl.
*B01D 53/14*    (2006.01)
(52) U.S. Cl.
USPC .......... 96/242; 96/251; 96/252; 95/14; 95/23; 95/183; 95/227; 95/236
(58) Field of Classification Search
None
See application file for complete search history.

(56) References Cited

U.S. PATENT DOCUMENTS

| | | | | |
|---|---|---|---|---|
| 2,742,102 | A * | 4/1956 | Eichmann | 62/625 |
| 8,088,196 | B2 * | 1/2012 | White et al. | 95/51 |
| 2008/0127831 | A1 * | 6/2008 | Rochelle et al. | 96/181 |
| 2011/0203314 | A1 * | 8/2011 | Mak | 62/617 |
| 2011/0239700 | A1 * | 10/2011 | Hasse et al. | 62/617 |
| 2012/0009109 | A1 * | 1/2012 | Wright et al. | 423/239.1 |
| 2012/0111051 | A1 * | 5/2012 | Kulkarni et al. | 62/619 |
| 2012/0137728 | A1 * | 6/2012 | Zanganeh et al. | 62/617 |
| 2012/0216540 | A1 * | 8/2012 | Stoever et al. | 60/653 |
| 2012/0237407 | A1 * | 9/2012 | White et al. | 422/160 |

FOREIGN PATENT DOCUMENTS

| | | |
|---|---|---|
| JP | 05096131 A | 4/1993 |
| JP | 2006232596 A | 9/2006 |
| JP | 2009221098 A | 10/2009 |
| JP | 2009221574 A | 10/2009 |
| KR | 10-0918883 | 1/2007 |
| KR | 10-2008-0024790 | 3/2008 |
| KR | 10-2010-0018974 | 2/2010 |

* cited by examiner

*Primary Examiner* — Duane Smith
*Assistant Examiner* — Pankti Patel
(74) *Attorney, Agent, or Firm* — Edwards Wildman Palmer LLP; Peter F. Corless

(57) ABSTRACT

Provided is an apparatus for regenerating a carbon dioxide absorption solution that regenerates an absorption solution for absorbing carbon dioxide contained in a combustion exhaust gas emitted during a combustion process of a vehicle, thereby reducing energy costs while simplifying its configuration. The apparatus includes a first storage tank for storing an absorption solution that contains absorbed $CO_2$; a regeneration column for generating an absorption solution regenerated by heating the absorption solution to free/release $CO_2$; a separation drum for separating the $CO_2$ freed/released during the regeneration; a multi-stepped compressor for compressing the separated $CO_2$; a heat exchanger for performing a heat exchange between the absorption solution discharged from the first storage tank and the $CO_2$ compressed in the multi-stepped compressor; a temperature sensor for detecting temperature of the absorption solution after the heat exchange in the heat exchanger; and a flow meter for controlling a flow rate of the absorption solution passing through the heat exchanger according to the temperature of the absorption solution detected by the temperature sensor.

7 Claims, 2 Drawing Sheets

APPARATUS FOR REGENERATING A CARBON DIOXIDE ABSORPTION SOLUTION

CROSS-REFERENCE TO RELATED APPLICATION

This application claims under 35 U.S.C. §119(a) the benefit of Korean Patent Application No. 10-2010-0121037 filed Nov. 30, 2010, the entire contents of which are incorporated herein by reference.

BACKGROUND (a) Technical Field

The present invention relates to an apparatus for regenerating a carbon dioxide absorption solution. More particularly, it relates to a carbon dioxide absorption solution regenerating apparatus capable of regenerating an absorption solution which absorbs carbon dioxide (hereinafter, $CO_2$) contained in a combustion exhaust gas emitted during a combustion process of a vehicle.

(b) Background Art

Representatives from all over the world, perceiving the seriousness of global warming, gathered at Rio de Janeiro in Brazil in 1992 to sign up for the Framework Convention on Climate Change, the objective of which was to prepare a regulation plan for a period of time through 2000 whereby emissions of $CO_2$ which cause global warming would be reduced to below the 1990 level. The Convention was detailed in the enforcement plan according to the 1997 Kyoto Protocol, and the countries directly involved finally agreed to the enforcement plan of the Kyoto Protocol at the $7^{th}$ general meeting in November of 2001. Accordingly, the leading countries (countries in Annex 1 of the Kyoto Protocol) accepted and have been carrying out a compulsory greenhouse gas emission reduction plan. According to the results discussed by the countries directly involved on Dec. 13, 2007, Korea is expected to voluntarily carry out the compulsory greenhouse gas emission reduction plan after 2012. Korea was ranked at the top among the countries having the fastest increasing rate in its greenhouse gas emissions between 1990 and 2004, and still has the fastest increasing rate in its greenhouse gas emissions. Considering that 25% of the total amount of emitted greenhouse gas is emitted during a manufacturing process, it is urgent to prepare a greenhouse gas emission reduction plan to address that.

The methods for reducing the amount of $CO_2$ emission which occupies most of the amount of greenhouse gas emissions may generally be divided into the reduction of energy consumption, $CO_2$ recovery/storage, use of alternative energy, etc. Of these, the $CO_2$ recovery/storage method is under active development, particularly because it has the advantages of having little effect on industrial activities while enabling reuse of the recovered $CO_2$.

Among $CO_2$ absorption techniques, a chemical absorption method has been drawing much attention particularly because it is highly efficient in removing $CO_2$ and because it also enables processing of a mass flow of exhaust gas even at a relatively low $CO_2$ concentration of about 8 to 15 percent, which is the $CO_2$ contained in combustion exhaust gases emitted in most of manufacturing processes. Thus, chemical absorption provides advantages in terms of cost effectiveness and process applicability over the conventional recovering techniques such as adsorption methods and membrane separation methods.

To perform such a chemical absorption method, it has been very common to use as a $CO_2$ absorption solution regenerating apparatus a conventional apparatus. Generally the conventional apparatus in one in which an absorption solution that absorbs $CO_2$ from an absorption column is heated to a predetermined temperature so that $CO_2$ can be separated from the absorption solution, thereby regenerating the absorption solution, and at the same time, separating and recovering $CO_2$.

Korean Patent No. 0962871 provides an example of a $CO_2$ absorption solution regenerating apparatus that improves upon the conventional apparatus. In particular, the improved apparatus is configured to preheat an absorption solution with heat generated while compressing $CO_2$ at high pressure. FIG. 1 is a schematic configuration view showing an apparatus for regenerating a $CO_2$ absorption solution according to an illustrative embodiment of Korean Patent No. 0962871.

Such a $CO_2$ absorption solution regenerating apparatus, as shown in FIG. 1, is configured to perform preheating an absorption solution additionally by using waste heat which is created when heat is generated from a compressor during $CO_2$ compression and when an absorption solution condensed in a separation drum of a regeneration column is refluxed to the regeneration column, thereby improving thermal efficiency in an upper portion of the regeneration column.

In particular, in the $CO_2$ absorption solution regenerating apparatus as shown in FIG. 1, an absorption solution supplied to the absorption column at atmospheric pressure makes contact with a combustion exhaust gas containing $CO_2$ emitted during a manufacturing process to thereby absorb $CO_2$. Then, the absorption solution of the thus absorbed $CO_2$ is stored in a storage tank 10 (e.g., at around 90° C.) and is again transported to a $CO_2$ compressor 11 to be preheated.

The absorption solution that is thus transported recovers (exchanges) heat generated when $CO_2$ is compressed in the $CO_2$ compressor 11 using a heat exchanger mounted in the $CO_2$ compressor (e.g., at around 90° C.), and is thereby transported to a high temperature absorption solution flow rate control tank 12.

The absorption solution transported to the high temperature absorption solution flow rate control tank 12 is stored therein over a predetermined time, and provides flow rate control, and thereafter flows into a first heat exchanger 13. The absorption solution that flows into the first heat exchanger 13 exchanges heat therein with a regenerated absorption solution that is emitted at a relatively high temperature (e.g., around 100° C.), as compared to the absorption solution, through an absorption solution heater 17 at a lower position of the regeneration column 15. As a result, the absorption solution is thereby increased in temperature (e.g., to around 97° C.) and flows into an upper portion of the regeneration column 15.

As the absorption solution flows into the upper portion of the regeneration column 15 and passes through a storage station in the regeneration column 15 to flow into a lower portion thereof, the absorption solution is further heated so that $CO_2$ is separated from the absorption solution, and, finally, is regenerated. Here, the absorption solution, which was heated and vaporized, ascends toward an upper portion of the regeneration column 15, is discharged together with the separated $CO_2$, and is then compressed by the $CO_2$ compressor 11 to be stored in the storage tank 20 via a cooler.

As described above and as shown in FIG. 1, the separated $CO_2$ and the vaporized absorption solution as a $CO_2$ state at a high concentration of more than 99% are cooled in the cooler 16 for transporting to the separation drum 18, where they are then condensed in the separation drum 18, thereby decreasing their temperature (e.g., to around 6° C.). The absorption solution condensed in the separation drum 18 exchanges heat with the absorption solution (e.g., at around 92° C.) that was regenerated during flowing through the second heat exchanger 14 to the first heat exchanger 13. The absorption solution thereby is increased in its temperature (e.g., to around 82° C.) and is refluxed into an upper portion of the regeneration column 15. The apparatus is further configured so that the absorption solution regenerated in the second heat exchanger 14 is transported to an absorption column.

However, even when such a conventional $CO_2$ absorption solution regenerating apparatus is used, the regeneration of an absorption solution still requires a great amount of energy. Accordingly, there has been a long awaited need for the development of a system for regenerating a $CO_2$ absorption solution which is capable of reducing costs in such processes.

Further, such a conventional $CO_2$ absorption solution regenerating apparatus is configured to have multi-stepped compressors for compressing $CO_2$ at a high pressure. However, there has been a problem in that absorption solutions vary in temperature and in the amount of heat exchange with such multi-stepped compressors.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention relates a $CO_2$ absorption solution regenerating apparatus capable of reducing energy costs and simplifying its configuration.

In one aspect, the present invention provides an apparatus for regenerating a $CO_2$ absorption solution including a first storage tank for storing an absorption solution that contains absorbed $CO_2$; a regeneration column for generating an absorption solution regenerated by heating the absorption solution to free/release $CO_2$; a separation drum for separating the $CO_2$ freed/released during the regeneration; a multi-stepped compressor for compressing the $CO_2$ that has been separated; a heat exchanger for performing a heat exchange between the absorption solution discharged from the first storage tank and the $CO_2$ compressed in the steps of the multi-stepped compressor; a temperature sensor for detecting the temperature of the absorption solution after the heat exchange performed in the heat exchanger; and a flow meter for controlling a flow rate of the absorption solution passing through the heat exchanger according to the temperature of the absorption solution detected by the temperature sensor.

In a preferred embodiment, the present invention provides an apparatus for regenerating a $CO_2$ absorption solution that further includes a second storage tank for storing an absorption solution at high temperature, the absorption solution having been passed through the heat exchanger, and for transporting $CO_2$ freed in the second storage tank to the compressor.

In another preferred embodiment, the present invention provides an apparatus for regenerating a $CO_2$ absorption solution in which the absorption solution discharged from the second storage tank exchanges heat with the absorption solution regenerated from the regeneration column.

In still another preferred embodiment, the present invention provides an apparatus for regenerating a $CO_2$ absorption solution that further includes a third storage tank for storing the absorption solution discharged from the second storage tank, and for transporting the $CO_2$ freed/released in the third storage tank to the compressor.

In yet another preferred embodiment, the present invention provides an apparatus for regenerating a $CO_2$ absorption solution in which the absorption solution separated from the separation drum is transported to the first storage tank.

In still yet another preferred embodiment, the present invention provides an apparatus for regenerating a $CO_2$ absorption solution in which the flow meter controls the flow rate of $CO_2$ passing through the heat exchanger according to the temperature of the absorption solution detected by the temperature sensor.

In a further preferred embodiment, the present invention provides an apparatus for regenerating a $CO_2$ absorption solution that further includes a $CO_2$ storage tank for storing $CO_2$ of high pressure compressed by the compressor.

According to the present invention, as described above, simple devices such as the temperature sensor and flow meter and the like according to the present invention may be mounted on an absorber line for performing a heat exchange with a compressor line, thereby enabling controlled cooling of compressed $CO_2$ at high temperature and preheating of the absorber of low temperature, thereby reducing energy consumption.

In addition, the apparatus of the present invention does not require any additional configuration for cooling $CO_2$ thus obtained and for preheating an absorber, thereby simplifying the configuration of a $CO_2$ absorption solution regenerating apparatus and reducing investment cost in equipment.

In addition, the apparatus of the present invention enables the separation of $CO_2$ freed during the preheating from an absorption solution and recovers the separated $CO_2$ through an compressor. As a result, a process in which the freed $CO_2$ passes through the regeneration column can be omitted, and the costs in a regeneration process may be reduced.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
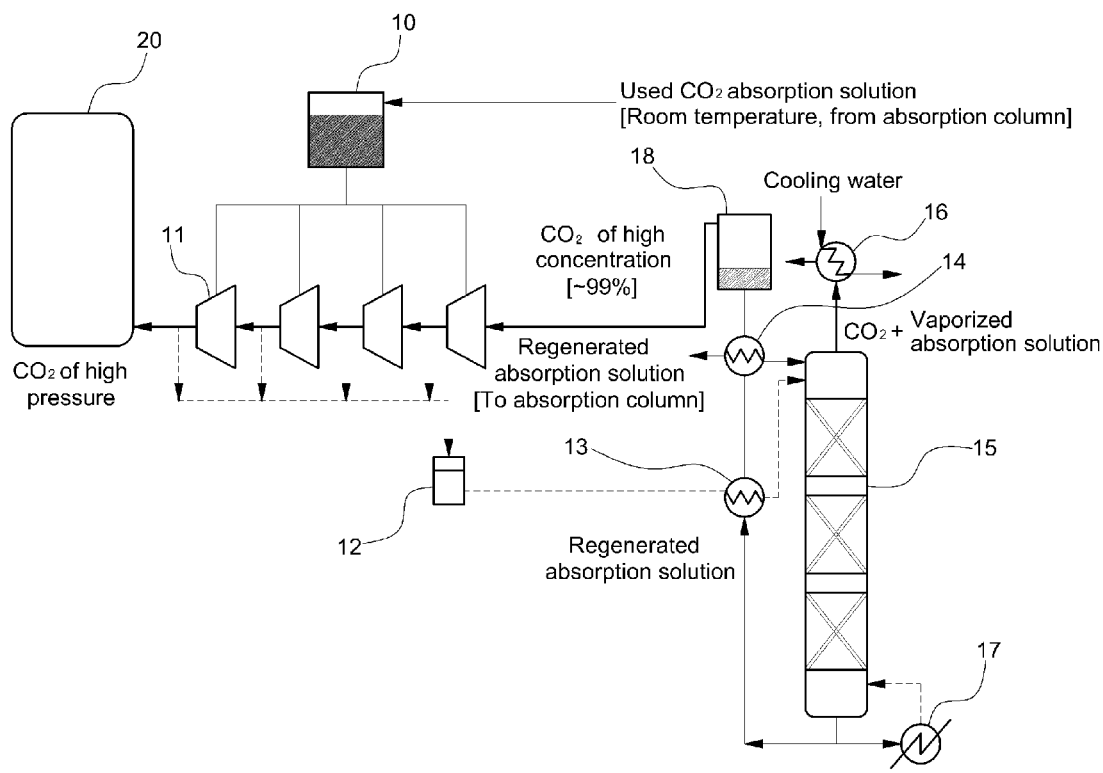
FIG. 1 is a schematic diagram showing a $CO_2$ absorption solution regenerating apparatus for regenerating by using a heat exchanger for an absorption solution that contains absorbed $CO_2$ contained in a combustion exhaust gas according to a conventional art.

Reference numerals set forth in the Drawings includes reference to the following elements as further discussed below:

| | |
|---|---|
| 110: first storage tank | 120: flow meter |
| 130: temperature sensor | 140: second storage tank |
| 150: third storage tank | 160: separation drum |
| 170: $CO_2$ compressor | 180: $CO_2$ storage tank |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The terminology used herein is for the purpose of describing particularly embodiments only and is not intended to be limiting of example embodiments.

As used herein, the singular forms "a", "an" and "the" are intended to include the plural forms as well, unless the context clearly indicates otherwise.

It will be further understood that the terms "comprising", "comprising", "includes" and/or "including", when used herein, specify the presence of stated features, integers, steps, operations, elements and/or components, but do not preclude the presence or addition of one or more other features, integers, steps, operations, elements, components and/or groups thereof.

The present invention generally relates to an apparatus for regenerating a $CO_2$ absorption solution. More particularly, the present invention relates to an apparatus for regenerating a $CO_2$ absorption solution, which is capable of controlling a flow rate of an absorber flowing into one or more compressors by means of a temperature sensor and a flow meter mounted in an absorber line, in a region of a compressor, in which a heat exchange is performed between a compressed $CO_2$ gas at high temperature and an absorber.

Hereinafter, an apparatus for generating a $CO_2$ absorption solution according to an exemplary embodiment of the invention will be described in further detail with reference to the accompanying drawings.

Figure 2:
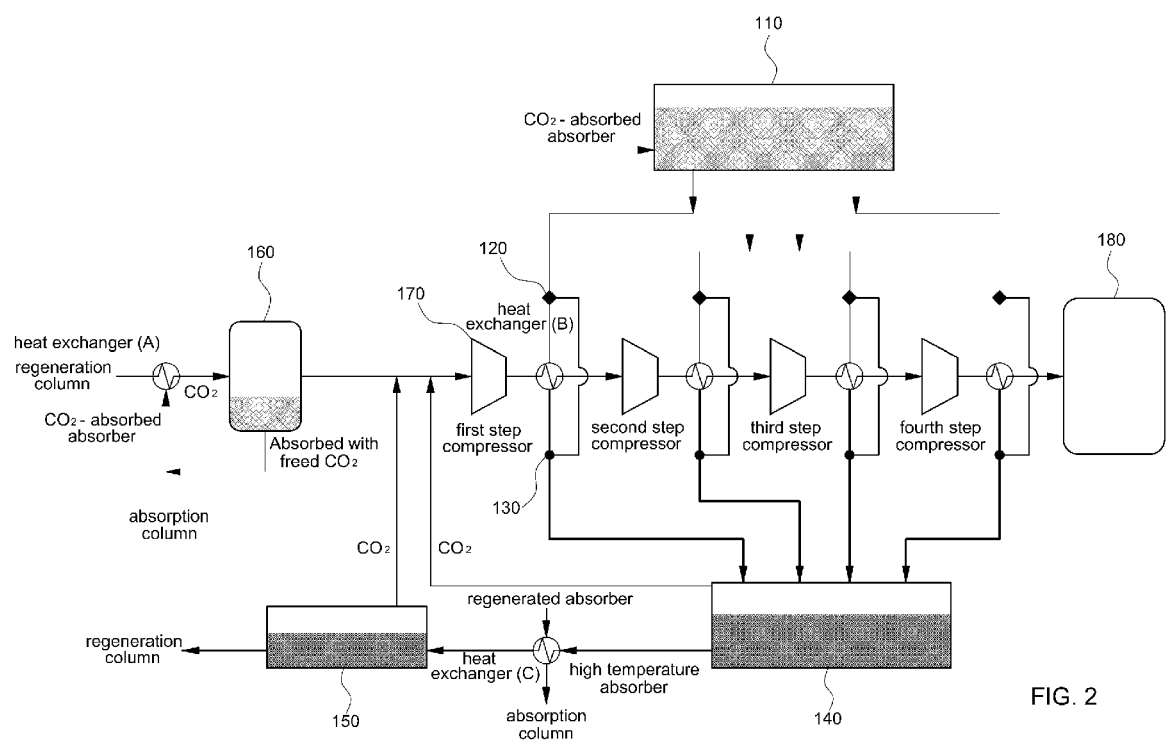
FIG. 2 is a schematic diagram showing an apparatus for regenerating a $CO_2$ absorption solution according to an exemplary embodiment of the present invention.

FIG. 2 is a schematic diagram showing main flowing paths of an absorption solution and $CO_2$ gas in the $CO_2$ absorption solution regenerating apparatus, and members that makes it possible for the absorber and $CO_2$ gas to flow therein according to an exemplary embodiment of the invention.

As shown in FIG. 2, the $CO_2$ absorption solution apparatus according to an exemplary embodiment of the invention includes an absorption column, a storage tank, a regeneration column, a separation drum, a multi-stepped compressor and a $CO_2$ storage tank.

Referring to the flow of the absorber and $CO_2$ gas in such a configuration, in the heat exchanger A at the front of the separator drum 160 the absorber solution (e.g., which is at a suitable temperature, such as around 50° C.), which has absorbed $CO_2$ in the absorption column, comes into contact with $CO_2$ at high temperature (e.g., around 120° C.) from a regeneration column to thereby be preheated. The absorber solution is then stored in the first storage tank 110 (for instance, at around 60° C.) for controlling a flow rate thereof. Thereafter, the absorber solution is transported to a heat exchanger of the $CO_2$ compressor 170 side.

Meanwhile, as shown in FIG. 2, as the amount of heat exchange varies with each step of the multi-stepped compressor 170, which is configured to compress $CO_2$ gas to a high pressure, the flow meter 120 and temperature sensor 130 are provided in an absorber line so that the absorber solution (hereinafter, absorption solution) passed through each step of the multi-stepped compressor may be stabilized at a uniform temperature.

The flow meter 120 and the temperature sensor 130 are configured to prevent an absorption solution from not being regenerated at an optimum temperature as it is difficult to control temperature of the absorption solution differently by varying with each step of the multi-stepped compressor 170.

Thus, according to an exemplary embodiment of the invention, in order to increase a compressed $CO_2$ cooling effect for compressor efficiency and maintain uniformly a preheating temperature of the absorption solution after the heat exchange, the flow rate of the absorption solution flowing in the heat exchanger B from the flow meter 120 and the temperature sensor 130 is controlled.

As shown in FIG. 2, the flow meter 120 and the temperature sensor 130 are arrayed at the front side and rear side of the heat exchanger B to measure the temperature of absorption solution which is heat-exchanged in the heat exchanger, and to further control the flow rate of the absorption solution passing through the heat exchanger B. As such, the absorption solution is maintained at a predetermined temperature uniformly.

Alternatively, the same object may be obtained by installing the flow meter in the compression line of $CO_2$, such that the flow rate of $CO_2$ compressed when passing through the compressor 170 may be controlled according to each value detected by the temperature sensor in an absorption solution line.

The absorption solution at a suitable high temperature (for instance, about 90° C.), which was heat-exchanged with the $CO_2$ compressor 170 at a flow rate optimized by the flow meter and the temperature, is stored in the second storage tank 140 for a period of time.

Meanwhile, according to an exemplary embodiment of the invention, the $CO_2$ gas freed/released in the second storage tank 140 is transported to a position between the separation drum 160 and the compressor 170. Thereafter the $CO_2$ gas is compressed and stored without passing through the regeneration column.

The absorption solution in a flow rate controlling tank is again heat-exchanged through the heat exchanger C with the absorption solution that is discharged from and regenerated by a lower portion of the regeneration column. The discharged/regenerated absorption solution is at a higher temperature (e.g., around 100° C.) than the absorption solution in the flow rate controlling tank, and thus the temperature of the absorption solution in the flow rate controlling tank is thereby further increased by the heat-exchange (for instance, to around 97° C.). The absorption solution thus heat-exchanged and increased in temperature is then stored in the third storage tank 150 which is an additional storage tank at high temperature absorption solution. Further, the $CO_2$ freed is transported in between the separation drum 160 and the compressor 170 where it is compressed and stored with the $CO_2$ freed in the second storage tank 140.

Thus, according to an exemplary embodiment of the present invention, the $CO_2$ absorption solution device allows the $CO_2$ freed in the second storage tank 140 and the third storage tank 150 to be sent to the compressor 170 side directly without passing through the regeneration column. As such, a corresponding processing of an absorption solution in the regeneration column can thereby be eliminated and energy consumption can be reduced.

Meanwhile, the absorption solution which is stored in the third storage tank 150 again flows in an upper portion of the regeneration column and is processed in the regeneration column.

As the absorption solution which flowed in the upper portion of the regeneration column passes through a storage station and flows in a lower portion of the regeneration column, the absorption solution is further heated to thereby free/release $CO_2$ from the absorption, solution. At the same time, the absorption solution is regenerated. The freed/released $CO_2$ is discharged to the upper portion of the regeneration column together with the vaporized absorption solution to be cooled in the heat exchanger A. Thereafter, the cooled $CO_2$ is compressed to a high pressure by the $CO_2$ compressor 170 and is stored in the $CO_2$ storage tank 180.

The vaporized absorption solution discharged together with the freed $CO_2$ is cooled in the heat exchanger and is condensed in the separation drum 160, thereby decreasing its temperature (e.g., to around 60° C.). The absorption solution is then transported to the storage tank to be preheated, and thereafter it flows into the upper portion of the regeneration column, before reaching the regeneration column.

In particular, the absorption solution discharged from the separation drum 160, as shown in FIG. 2, is related to the absorber line ranged from an absorption column of the heat exchanger A side to the first storage tank 110. Thus, the discharged absorption solution can be processed with the same preheating procedure as the absorption solution in the absorption column, and thereafter can flow into the upper portion of the regeneration column.

It is noted that although a 4-stepped compressor only was exemplified in FIG. 2 considering a compressed $CO_2$ gas of maximum 100 atmospheric pressure, the invention is not limited to the 4-stepped compressor capable of being applied to the $CO_2$ absorption solution regeneration method according to the exemplary embodiment of the invention. Rather, the compressor may be provided with any number of steps and can further be any kind of compressor. For example, the present invention allows even for any type of compressor as long as the compressor may serve to recover heat generated during compressing of $CO_2$ gas with the compressor.

Also, the absorption solution regenerated according to the invention is not particularly limited in its composition, but rather, can be any suitable absorption solution that is capable of use in a chemical absorption method.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An apparatus for regenerating a $CO_2$ absorption solution comprising:
    a first storage tank for storing an absorption solution that contains absorbed $CO_2$;
    a regeneration column for generating an absorption solution regenerated by heating the absorption solution to free $CO_2$;
    a separation drum for separating the $CO_2$ freed during the regeneration from the absorption solution;
    a multi-stepped compressor for compressing the $CO_2$ separated by the separation drum;
    a heat exchanger for performing a heat exchange between absorption solution discharged from the first storage tank and the $CO_2$ compressed in the multi-stepped compressor;
    a temperature sensor for detecting temperature of the absorption solution after the heat exchange in the heat exchanger; and
    a flow meter for controlling a flow rate of the absorption solution passing through the heat exchanger according to the temperature of the absorption solution detected by the temperature sensor.

2. The apparatus for regenerating a $CO_2$ absorption solution according to claim 1, further comprising a second storage tank for storing an absorption solution at high temperature, wherein the absorption solution at high temperature has passed through the heat exchanger, and wherein $CO_2$ freed in the second storage tank is transported to the compressor.

3. The apparatus for regenerating a $CO_2$ absorption solution according to claim 2, wherein absorption solution discharged from the second storage tank exchanges heat with an absorption solution regenerated from the regeneration column.

4. The apparatus for regenerating a $CO_2$ absorption solution according to claim 3, further comprising a third storage tank for storing the absorption solution discharged from the second storage tank, and wherein $CO_2$ freed in the third storage tank is transported to the compressor.

5. The apparatus for regenerating a $CO_2$ absorption solution according to claim 1, wherein the absorption solution separated from the freed $CO_2$ in the separation drum is transported to the first storage tank.

6. The apparatus for regenerating a $CO_2$ absorption solution according to claim 1, wherein the flow meter controls the flow rate of $CO_2$ passing through the heat exchanger according to the temperature of the absorption solution detected by the temperature sensor.

7. The apparatus for regenerating a $CO_2$ absorption solution according to claim 1, further comprising a $CO_2$ storage tank for storing $CO_2$ of high pressure compressed by the compressor.

* * * * *